(12) United States Patent
Johnsson

(10) Patent No.: US 7,984,134 B2
(45) Date of Patent: Jul. 19, 2011

(54) NAME-ADDRESS MANAGEMENT IN COMMUNICATION NETWORKS

(75) Inventor: Martin Johnsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 284 days.

(21) Appl. No.: 12/304,170

(22) PCT Filed: Jun. 15, 2006

(86) PCT No.: PCT/SE2006/000725
§ 371 (c)(1),
(2), (4) Date: Dec. 10, 2008

(87) PCT Pub. No.: WO2007/145552
PCT Pub. Date: Dec. 21, 2007

(65) Prior Publication Data
US 2009/0248873 A1    Oct. 1, 2009

(51) Int. Cl.
*G06F 15/173* (2006.01)
(52) U.S. Cl. ......... 709/223; 709/203; 709/219; 709/224
(58) Field of Classification Search .................. 709/223, 709/224, 203, 217, 219
See application file for complete search history.

(56) References Cited

U.S. PATENT DOCUMENTS

| 6,011,795 | A | 1/2000 | Varghese et al. | |
|---|---|---|---|---|
| 2002/0136387 | A1 | 9/2002 | Choi et al. | |
| 2003/0093562 | A1* | 5/2003 | Padala | 709/245 |
| 2004/0039845 | A1* | 2/2004 | Feldmeier et al. | 709/245 |
| 2005/0099971 | A1* | 5/2005 | Droms et al. | 370/328 |
| 2006/0050628 | A1* | 3/2006 | Ng et al. | 370/216 |
| 2008/0056207 | A1* | 3/2008 | Eriksson et al. | 370/338 |
| 2009/0083437 | A1* | 3/2009 | Mattila | 709/238 |
| 2009/0172115 | A1* | 7/2009 | Lu et al. | 709/206 |
| 2010/0166003 | A1* | 7/2010 | Eriksson | 370/401 |

FOREIGN PATENT DOCUMENTS

WO    WO 0210912 A1    2/2002

* cited by examiner

*Primary Examiner* — Lashonda T Jacobs

(57) ABSTRACT

A network infrastructure and method for name-address management in an internetwork having a hierarchical address structure with a number of address areas on different levels of the address structure. For a given resource, a distributed name-to-address resolution chain is built up through the hierarchical address structure utilizing a set of interlinked resolution key codes for bridging between address areas. During routing of a message, name-to-address resolution is performed by successively backtracking the chain through the hierarchical address structure utilizing the interlinked resolution key codes to bridge between address areas on different levels.

24 Claims, 12 Drawing Sheets

NAME-ADDRESS MANAGEMENT IN COMMUNICATION NETWORKS

TECHNICAL FIELD

The present invention generally relates to name-address management issues in communication networks such as name-to-address resolution and name-address registration.

BACKGROUND

Name-address management generally includes issues such as name-to-address resolution and name-address registration. Name-to-address resolution is a procedure by which a "name" of a network resource is resolved or translated into a routable network address (i.e. a location in the network topology). In this context, name-address registration is of course the corresponding registration procedure by which the name and the assigned network address of the resource are registered in the network. The name of the resource is normally well-known to users and typically also stays the same over relatively long periods of time.

There exist many solutions that in one way or the other provide support for name-to-address resolution and registration.

The Internet community for example has via the Internet Engineering Task Force (IETF) defined the Domain Name System (DNS), which is described in the basic references [1-2] and updated and further developed in a multitude of additional references. DNS is a system that stores and provides information associated with domain names in a distributed database in networks such as the Internet. The DNS associates domain names with many types of information, but most importantly it provides the IP address for a given domain name. DNS makes it possible to associate easy-to-remember domain names (such as ericsson.com) with hard-to-remember IP addresses.

DNS is suitable for resources that rarely change their location, but is not adapted for mobility. Another characteristic of the DNS system is that it stores the full reachable IP address in the distributed database. This is a clear drawback from a security perspective. Dynamic DNS was defined, e.g. in reference [3], to provide better support for rapid updates of DNS, but it is still far from being suitable for keeping track of roaming resources such as mobile phones and their users.

In Public Land Mobile Network (PLMN) type of systems, and specifically in GSM and 3G cellular networks, the resolution is handled via the Home Location Register (HLR), and the Visited Location Register (VLR). Via HLR and VLR, a phone number (MS-ISDN) gets resolved into a routable E.164 address, if the phone with the MS-ISDN has registered with the cellular network. Further local mechanisms are used to route a call to the specific cell in which the phone is currently located.

The HLR and VLR have overall good performance and security support regarding name resolution in cellular systems. They are however tightly bounded to the E.164 address structure and as such does not provide an open architecture for other and/or arbitrary name and address spaces.

There is thus a general need for improved name-address management and name-to-address resolution systems.

SUMMARY

It is a general object of the present invention to provide improved name-address management in internetworks.

In particular, it is desirable to provide a scalable high-performance name resolution mechanism.

This and other objects are met by the invention as defined by the accompanying patent claims.

The invention mainly concerns internetworks having a hierarchical address structure with a number of address areas. In such a network, a basic idea of the invention is to successively build up, for a given resource, a distributed name-to-address resolution chain through the hierarchical address structure by means of a set of interlinked resolution key codes for bridging between address areas on different levels of the hierarchical address structure.

Name-to-address resolution may then be performed, during routing of a message in the internetwork, by successively back-tracing the distributed name-to-address resolution chain through said hierarchical address structure by means of the resolution key codes that bridge between address areas on different levels in the address structure.

The invention provides a generic and scalable mechanism that supports resolution from an arbitrarily chosen name space into an equally arbitrarily chosen address space, and may also provide the ability to bridge between different name and address schemes.

The invention also relates to a resolution server operable for storing, for a given resource, interlinked resolution key codes for bridging between address areas on different levels of the hierarchical address structure to support name-to-address resolution.

Further, the invention provides a resource location register operable for storing name information associated with a given resource together with a resolution key code and address area associated with the highest hierarchical level of the address structure to support name-to-address resolution. The stored resolution key code enables bridging to name resolution information including another resolution key code and address area at a lower level of the hierarchical address structure.

The invention also provides a network unit responsible for a moving network attaching to an internetwork having a hierarchical address structure. The network unit is operable for intercepting requests, from resources within the moving network to the internetwork, for successively building distributed name-to-address resolution chains through the hierarchical address structure, and replacing, on behalf of each such name-address registration request, the internal resource address with the internetwork address of the network unit.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
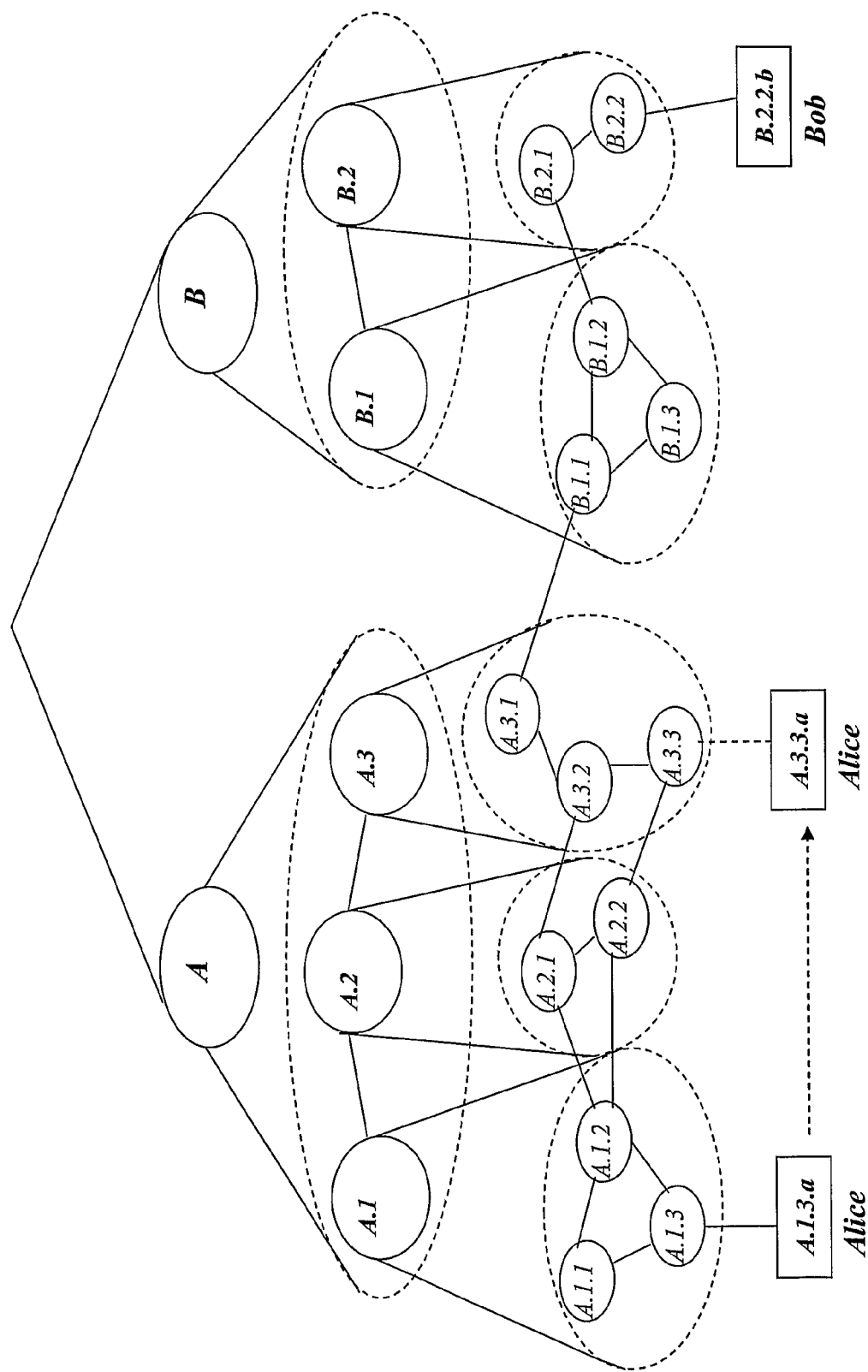
FIG. 1 is a schematic representation of an example of hierarchically structured internetwork.

Throughout the drawings, the same reference characters will be used for corresponding or similar elements.

The invention concerns internetworks that have a hierarchical address structure with a number of address areas, as schematically illustrated in FIG. 1. The hierarchical address structure normally comprises a number of different address areas on several hierarchical levels, where each address area is associated with an address prefix indicating the hierarchical level in the address structure.

The internetwork, which can be seen as an interconnected system of networks, comprises a number of network nodes, at least part of which act as attachment points to which various resources such as terminal entities and moving networks may attach. Each attachment point normally has a set of network addresses that can be assigned to attaching resources.

For example, the resource associated with the name "Alice" may be attached to a network node, e.g. A.1.3, which has assigned a network address such as A.1.3.*a* from its pool of available network address to "Alice". The network node A.1.3 belongs to the higher address area A.1, which in turn belongs to the address area A. It should be understood that logically A.1.3 can be regarded as an address area since there may be a set of addresses such as A.1.3.*a* to A.1.3.*n* sorting under A.1.3.

For "Alice", the hierarchical address structure can be appreciated by reference to the address table below.

TABLE 1

Hierarchical address table for "Alice".

A
A.1
A.1.3
A.1.3.a

Similarly, the resource "Bob" may be attached to a network node, e.g. B.2.2, which has assigned a network address such as B.2.2.*b* to "Bob". The network node B.2.2 belongs to the higher address area B.2, which in turn belongs to the address area B.

The situation when "Alice" moves from node A.1.3 to another attachment point such as A.3.3 is also indicated. In this example, "Alice is assigned address A.3.3.*a* by node A.3.3, which resides in area A.3, which in turn belongs to area A.

In a sense there may exist a number of address branches in the address structure originating from the address areas (e.g. A and B) on the highest level of the address structure.

It should be understood that the internetwork and its associated address structure is merely an example. The number of address areas and the number of hierarchical levels may of course be different, e.g. depending on the internetwork and the number of network nodes in the network.

In this type of network, the invention provides a generic and scalable mechanism and/or infrastructure for name-address management such as for example name-address registration and/or name-to-address resolution.

A basic idea of the invention is to successively build up, for a given resource, a distributed name-to-address resolution chain through the hierarchical address structure by means of a set of interlinked resolution key codes for bridging between address areas on different levels of the hierarchical address structure.

This provides the basis of the name-address management mechanism, which makes it possible to perform name-to-address resolution by successively back-tracing, during routing of a message in the internetwork, the distributed name-to-address resolution chain through said hierarchical address structure by means of the resolution key codes that bridge between address areas on different levels of the address structure.

Figure 2:
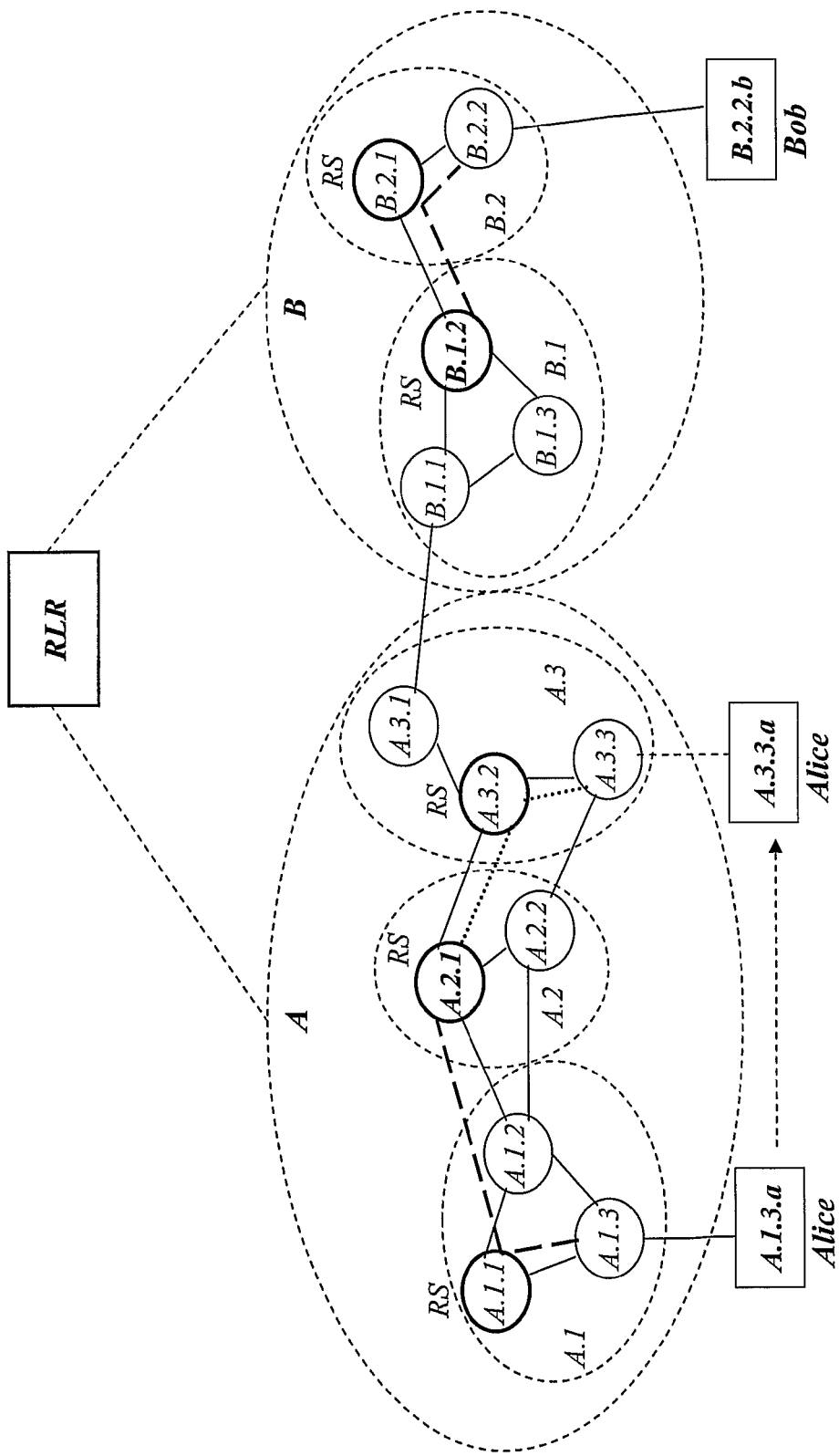
FIG. 2 is an alternative representation of the hierarchical network of FIG. 1, including a name-address management infrastructure according to a preferred exemplary embodiment of the invention.

FIG. 2 is an alternative representation of the hierarchical network of FIG. 1, including a name-address management infrastructure according to a preferred exemplary embodiment of the invention. The exemplary name-address management infrastructure is based on a number of resolutions servers, where each resolution server (RS) is associated with or responsible for a given address area at a given level in the hierarchical address structure.

With reference to the particular example shown in FIG. 2, address area A.1 has a resolution server (RS) in node A.1.1, area A.2 has a resolution server in node A.2.1, and area A.3 has a server in node A.3.2. In this particular example, the resolution server in node A.2.1 is also responsible for the entire address area A. Similarly, address area B.1 has a resolution server in node B.1.2, and address area B.2 has a resolution server in node B.2.1, where the server in node B.1.2 is also responsible for address area B. It is assumed that all network nodes within a given address area knows which resolution server it should contact (through proper control definitions in the nodes) and each resolution server knows its relative position in the hierarchical structure of resolution servers.

Each resolution server (RS) is preferably operable for storing an associated resolution key code linked to name resolution information associated with a lower hierarchical level of said address structure. Preferably, the name resolution information includes information indicating an address area at a lower hierarchical level and a resolution key code associated with the address area at the lower hierarchical level to enable proper definition and back-tracing of the name-to-address resolution chain. This generally holds true for each of the so-called "intermediate" resolution key codes, but is not always fully applicable at the transition to the lowest level, where the final address is reached and there is no real need for any further resolution key codes. As will be explained, there may also exist alternative mechanisms for fully resolving the network address at the lowest levels of the hierarchical address structure.

For name-address registration of a resource attaching to the internetwork, each of the relevant resolution servers preferably forwards its associated resolution key code together with information on the address area of the resolution server and the required name information to a resolution server at a higher level and address area of the hierarchical address structure, and so forth until the highest hierarchical level has been reached and a full name-to-address resolution chain has been defined.

In other words, the relevant information is transferred from a resolution server responsible for an address area at a given hierarchical level to a resolution server responsible for an address area at a higher hierarchical level, and repeated level by level until the highest level has been reached.

In a sense, the name-to-address resolution chain can be regarded as a linked list structure distributed over the hierarchical levels of the address structure with resolution key codes as a means for linking between the stages of the linked list.

The exemplary name-address management system of FIG. 2 preferably also comprises a so-called resource location register (RLR), which is a centralized top-level register that stores, for any given resource, name information linked to a resolution key code and address area associated with the highest hierarchical level of the address structure. By definition, the top-level register is located on top of the highest hierarchical level of the address structure.

When a complete distributed name-to-address resolution chain has been defined, the name information of the considered resource is thus preferably stored in the top-level resource location register linked to a resolution key code associated with an address area at the highest level of the address structure as well as linked to information on the associated address area.

For example, this means that the resource location register only has to store the relevant resolution key code together with information such as "Alice is in A". This information together with the resolution key code makes it possible to initiate the name-to-address resolution downwards through the address structure, as will be explained in detail later on. A user such as "Bob" that makes a name-to-address resolution request for "Alice" to the resource location register will then only receive the information "Alice is in A" together with a single resolution key code. This provides excellent support for increased privacy.

In addition, the name information does not have to be stored in the resolution servers, only forwarded upwards for storage in the resource location register. This means that, if so desired, the name information only needs to be present at the top-level.

The resolution servers thus support configuration and/or back-tracing of name-to-address resolution chains through the hierarchical address structure, and the resource location register supports registration of the corresponding names in a way that makes it possible to initiate back-tracing of the resolution chains without revealing the entire network addresses to users requesting name-to-address resolution.

Names are preferably resolved, during routing of a message to the destination, by successively resolving the hierarchically structured address space until the full network address has been retrieved.

The invention generally supports the ability for resolution from an arbitrarily chosen name space into an arbitrarily chosen address space, and is generally able to bridge between different name and address schemes if desired.

Scalability is also well catered for as the invention defines a highly distributed mechanism for name-address management. Only top level resolution defines a logically centralized mechanism, but which just like other server- and/or register-like implementations can be physically distributed for capacity, resilience and load balancing purposes.

As will be explained later on in connection with a particular embodiment, the generic mechanism according to the invention can provide excellent support for a high degree of mobility.

It should also be understood that the resolution servers can be implemented in any network component(s) in the internetwork, as long as they are in appropriate communication with the relevant network nodes (attachment points) in the respective address area.

For a better understanding, the invention will now be described in greater detail with reference to FIGS. 3-12.

Figure 3:
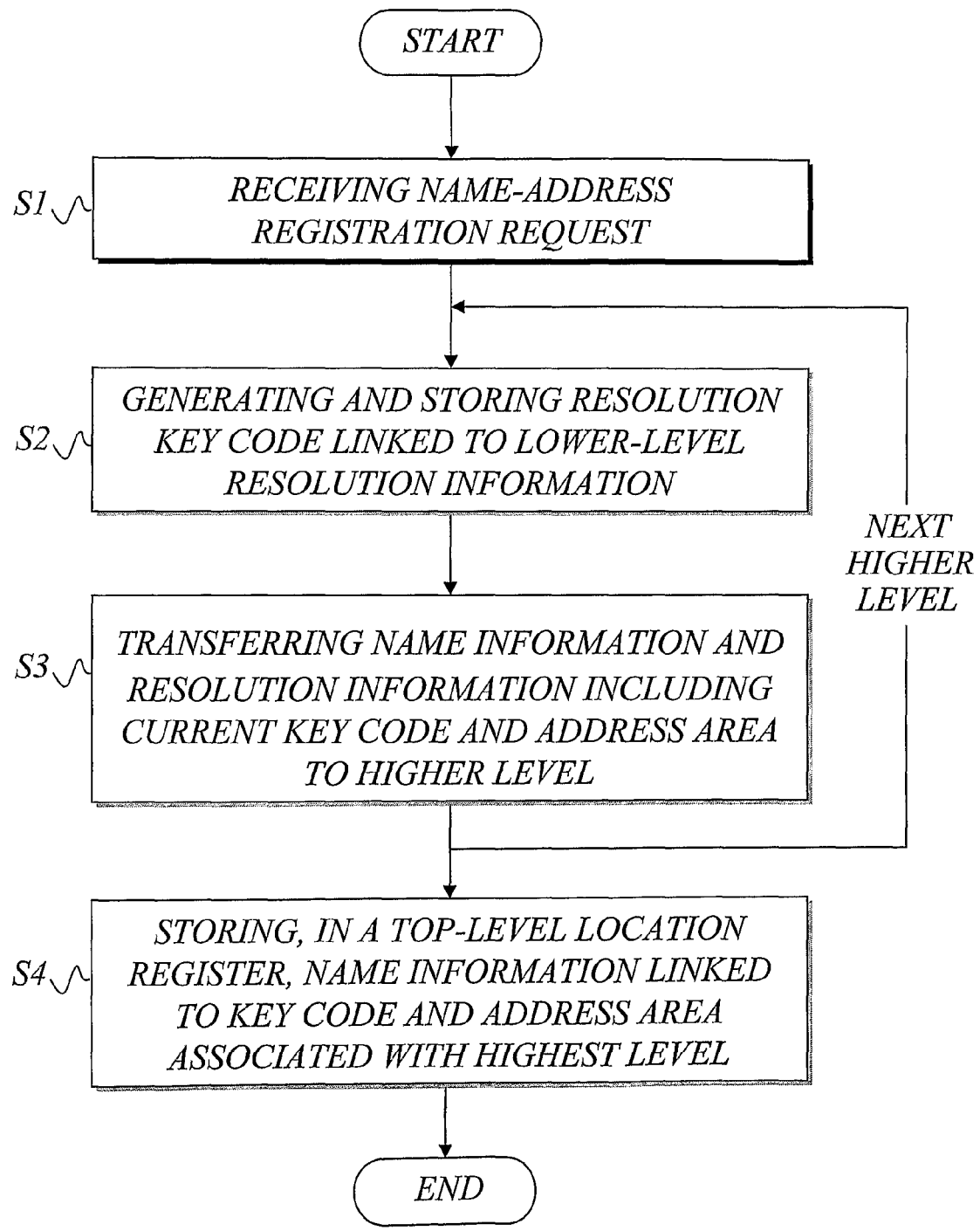
FIG. 3 is a schematic flow diagram of a name-address registration procedure according to a preferred exemplary embodiment of the invention.

FIG. 3 is a schematic flow diagram of a name-address registration procedure according to a preferred exemplary embodiment of the invention.

The procedure of successively building up a distributed name-to-address resolution chain, sometimes also referred to as name-address registration, is normally initiated in response to a name-address registration request, as indicated in step S1. Each of involved resolution key codes is generated and stored in an associated resolution server at the corresponding hierarchical level and address area together with name resolution information associated with a lower hierarchical level of said address structure, as indicated in step S2. Each of the resolution key codes is also transferred from its associated resolution server at the corresponding hierarchical level together with information on the corresponding address area and the name information to a resolution server responsible for the relevant address area (in the same branch) at a higher hierarchical level of the address structure, as indicated in step S3. In other words, the steps S2 and S3 indicated in FIG. 3 may thus be repeated a number of times until the highest hierarchical level is reached. Finally, the name information is stored in a top-level resource location register together with the resolution key code and address area associated with the highest hierarchical level of the address structure, as indicated in step S4.

Figure 4:
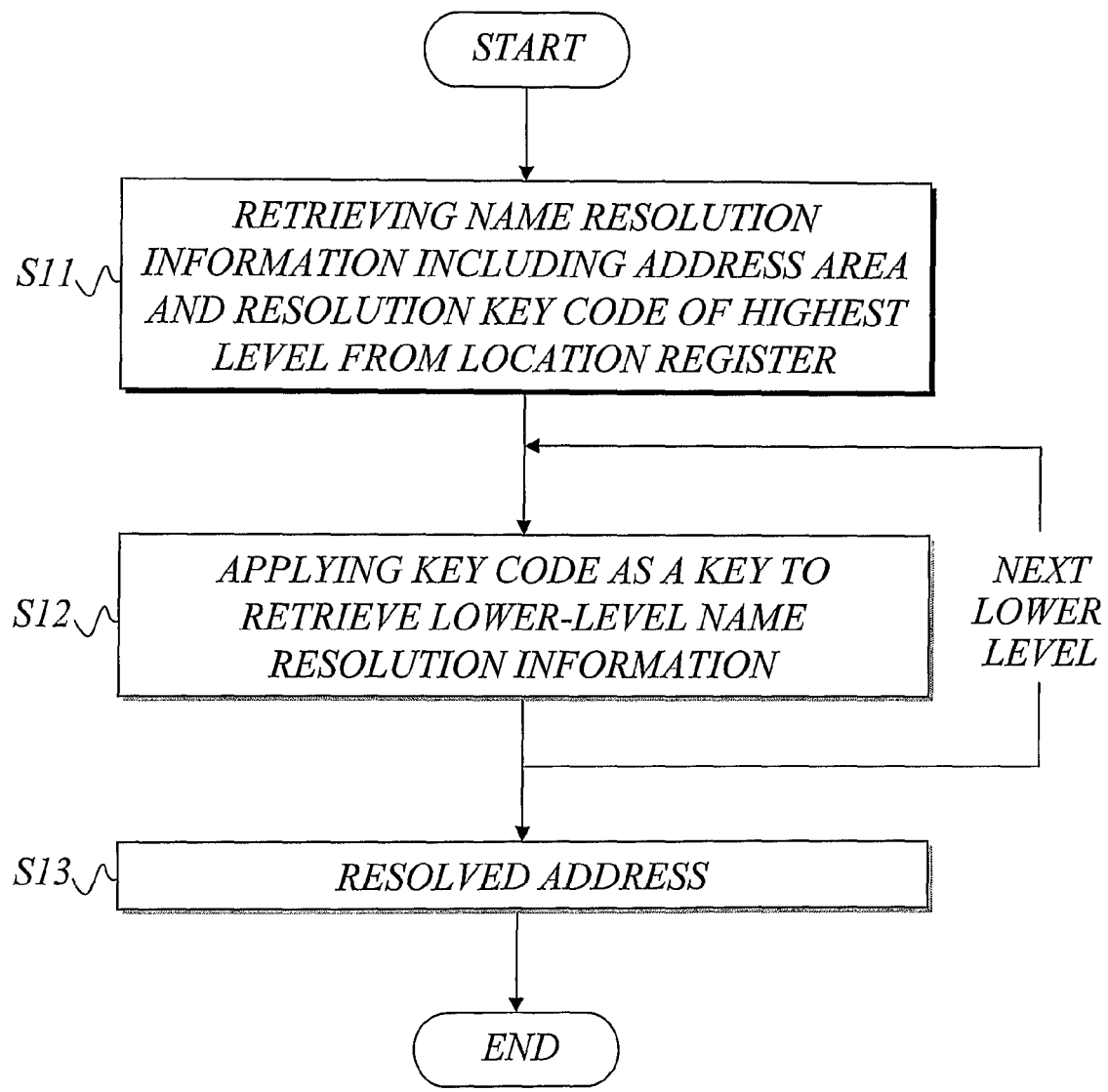
FIG. 4 is a schematic flow diagram of a name-to-address resolution procedure according to a preferred exemplary embodiment of the invention.

FIG. 4 is a schematic flow diagram of a name-to-address resolution procedure according to a preferred exemplary embodiment of the invention. As previously mentioned, name-to-address resolution is performed during routing of a message through the internetwork. The successive name-to-address resolution can start once name resolution information that includes an address area and a resolution key code of the highest hierarchical level is retrieved from the resource location register, as indicated in step S11. The retrieval of the relevant information is generally initiated in response to a name resolution request from a user such as "Bob" that wants to connect to a particular resource such as "Alice". The retrieved information from the location register could be "Alice is in A" and a resolution key code that is associated with address area A. The retrieved resolution key code may then be applied as an input key to the resolution server associated with the given address area, A in this case, to retrieve lower-level name resolution information, as indicated in step S12. This information normally includes an address area at the next lower hierarchical level, and normally also a resolution key code associated with an address area at the next lower hierarchical level. For example, "Alice is in A.1" together with the resolution key code associated with address area A.1. If necessary, step S12 can then be repeated a number of times, until the last resolution key code in the name-to-address resolution chain or the name associated with the resource finally points out a full address of the resource as indicated in step S13.

The invention provides for a name resolution concept that from a name space, comprising names (e.g. a URL, a SIP name or a phone number) that are usually used by end users to refer to other end users or resources on a network, via a structure that can be regarded as a "linked list" implemented distributed over part of the involved network(s) provides the network address (e.g. an IPv4 or IPv6 address) through which the corresponding resources can be reached.

The names can be any name space, and also a mix of them, and the addresses can be any address space and also a mix of them (using conventional gatewaying between the different address spaces). For example, it should be noted that the user requesting a name to be resolved into an address can be in a name and address space different from the called user, and still be able to setup a communication with that user.

For those readers that are familiar with terms like "user plane" and "control plane", it will be clear that the invention mainly targets the control plane functionality of the communication, i.e. the phase during which connectivity is established between communicating users. It is only required to perform this procedure once for a specific communication setup, and once connectivity has been established, conventional user plane functionality may be employed for transfer of user information.

Once a name-to-address resolution chain has been established, the pre-stored resolution key codes (also referred to as transaction codes) can be used for successively breaking down the name resolution information stored in the resource location register to the resource's actual location. The resolution key codes can be seen as pointers to a list for fast lookup. Name resolution is thus performed successively as the message is routed through the internetwork and the address hierarchy, and gets more and more fine-grained as it approaches the destination. This also reduces latency because there is no need to first resolve the name to an address, and then start routing the message.

As will be understood there is generally a name-to-address resolution chain for each name to be resolved. The name-to-address resolution chain should not be confused with the path or route between source and destination for a message.

As will be explained later on, the invention effectively supports update of the name resolution chains at location updates (movements of the resources within the internetwork). Conveniently, the name resolution chains only need to be updated up to the level of the movement in the hierarchically structured network.

Exemplary Procedures

Now, a number of useful name-address management procedures will be explained in greater detail with reference to the following illustrative examples.

Registration

Figure 5:
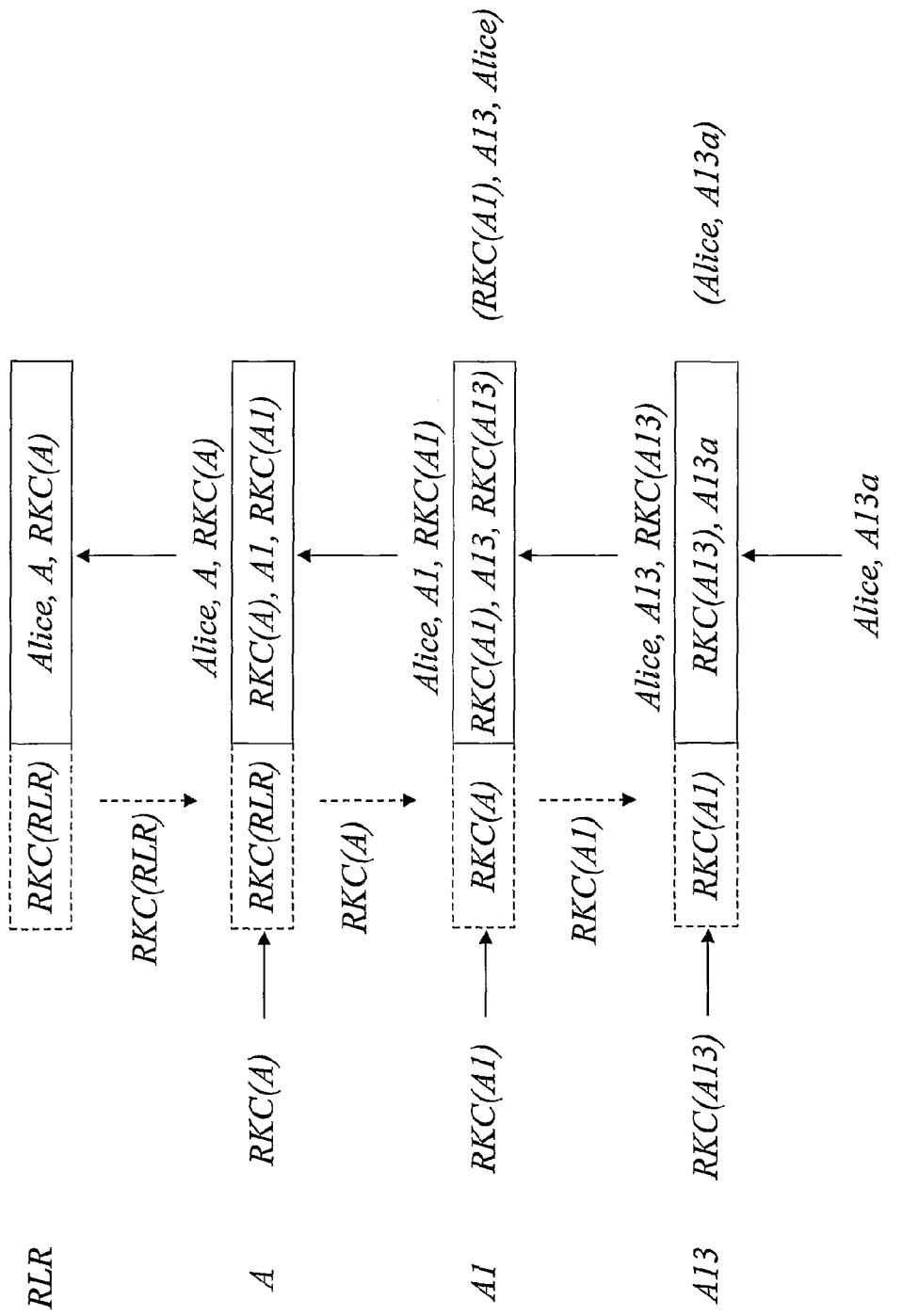
FIG. 5 is a schematic diagram illustrating an example of a name-address registration procedure in which a distributed name-to-address resolution chain is successively built up through the hierarchical address structure by means of resolution key codes.

FIG. 5 is a schematic diagram illustrating an example of a name-address registration procedure in which a distributed name-to-address resolution chain is successively built up through the hierarchical address structure by means of resolution key codes.

With reference to FIG. 2 and FIG. 5, it can be appreciated that "Alice" connects to network node A.1.3, and wants to make a name-address registration with the network.

1. The resource of Alice, such as a user terminal, attaches to the attachment point of network node A.1.3, and the attachment point assigns a network address such as A.1.3.a from the available address range of the node.
2. The name-address registration is either initiated by the user, which forwards the user name "Alice" and the assigned address A.1.3.a in a name-address request to the attachment point, or by the attachment point after it has assigned the address to the resource.
3. If the network node A.1.3 has a resolution server (RS) "of its own", this server preferably generates a local resolution key code RKC(A13), which is stored together with the assigned network address A.1.3.a of the resource. Alternatively, a non-local resolution server is utilized for managing the resolution key code(s).
4. The resolution server and/or the network node A.1.3 forwards the name Alice together with the address of the resolution server/node and the corresponding resolution key code to the resolution server on the next higher level (A.1) of the address structure (and in the same branch as the current resolution server).

Alternatively, the network node A.1.3 acting as attachment point and knowing the address and name of Alice may be configured for storing the name and assigned address without any resolution key code. Although this is a possible solution it is not always preferred since the name has to be stored at this level and the next higher level as well.
5. The resolution server (RS) of A.1 (here residing in node A.1.1) generates a local resolution key code RKC(A.1), which is stored together with information on the address area A.1.3 of the node/resolution server on the next lower level and the corresponding key code RKC(A13).
6. The resolution server and/or the network node A.1 forwards the name Alice together with the address area A.1 of the current resolution server/node and the corresponding resolution key code RKC(A1) to the resolution server on the next higher level in the resolution server hierarchy.

Alternatively, if no resolution server is used on the A.1.3 level, the resolution key code RKC(A13) is stored together with info on the network node address A.1.3 (which logically can be regarded as an address area in the hierarchical address structure) and the name Alice.
7. The resolution server (RS) of A (here residing in node A.2.1) generates a local resolution key code RKC(A), which is stored together with information on the address area A.1 of the node/resolution server on the next lower level and the corresponding key code RKC(A1).
8. The resolution server and/or the network node A forwards the name Alice together with the address area A of the current resolution server/node and the corresponding resolution key code RKC(A) to the top-level resource location register (RLR).
9. The RLR stores the name "Alice" together with information on the address area A of the node/resolution server on the next lower level (which is the highest level of the actual address structure) and the corresponding key code RKC (A).

Optionally, it may be desirable to generate a resolution key code in the RLR, and forward this key code RKC(RLR) down to the RS of A for storage therein. Similarly, the key code RKC(A) generated by RS of A may be forwarded down to the RS of A1 and stored therein, and the key code RKC(A1) generated by RS of A1 may be forwarded to the node or resolution server of A.1.3. This may be advantageous for fast and efficient update of the name-to-address resolution chains at location updates, as will be explained in detail later on.

Name-to-Address Resolution

Figure 6:
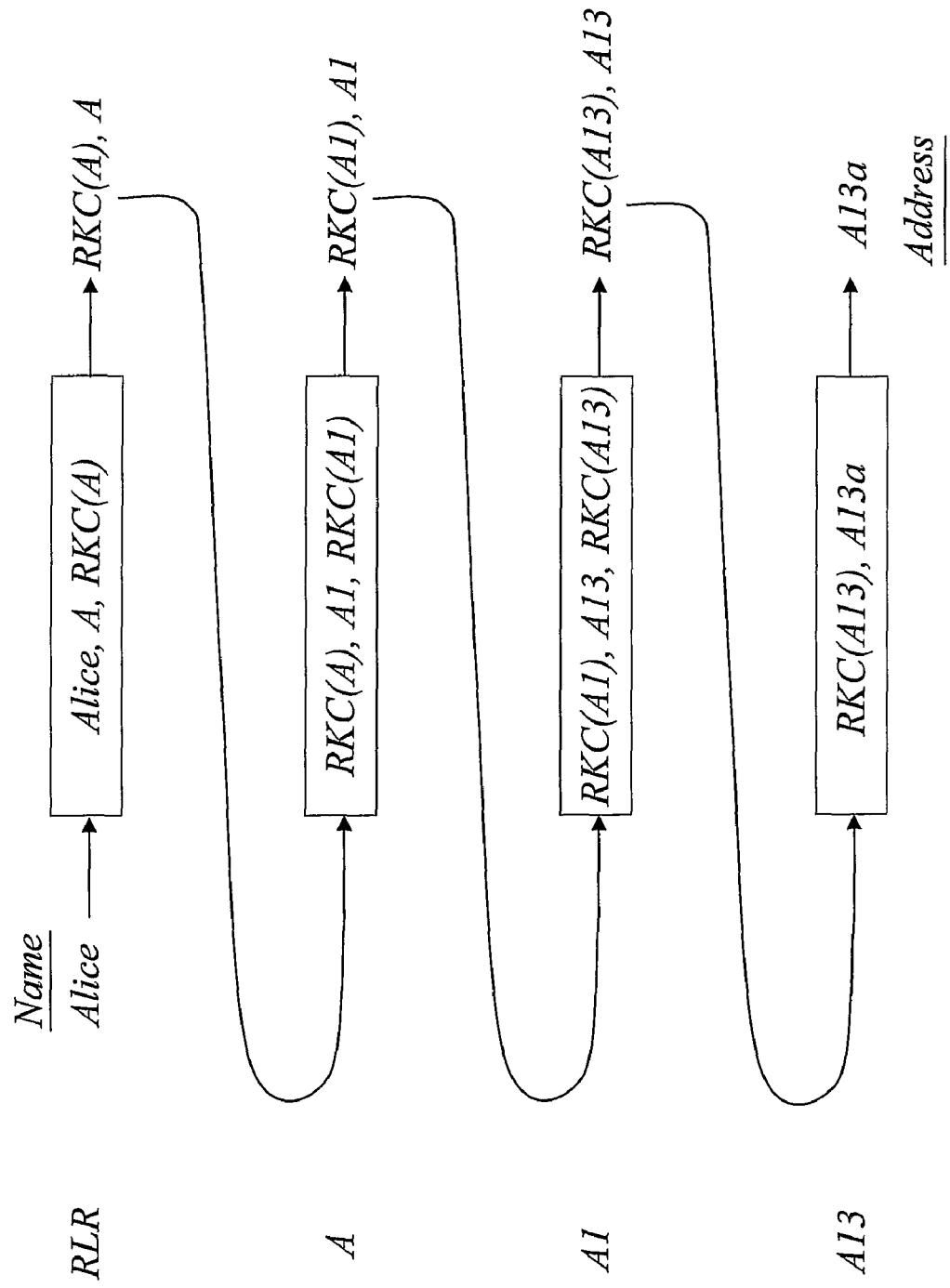
FIG. 6 is a schematic diagram illustrating an example of a name-to-address resolution procedure in which a name is resolved into a full resource address by means of the interlinked resolution key codes.

FIG. 6 is a schematic diagram illustrating an example of a name-to-address resolution procedure in which a name is resolved into a full resource address by means of the interlinked resolution key codes.

With reference to FIG. 2 and FIG. 6, it is assumed that "Bob" wants to initiate a session with "Alice". In this example, Bob is attached to network node B.2.2.

1. Bob initiates a call/session with Alice by sending a call initiation request to the network node B.2.2.
2. The network node B.2.2 sends a name-to-address resolution request to the RLR. In this example, it is assumed that the network nodes know how to come into contact with the RLR.

Then the following steps may be performed by the name-address management infrastructure:

3. The RLR receives the name-to-address resolution request including the name information ("Alice"), and responds with the name resolution information including information on the address area A and the resolution key code RKC(A) of the highest hierarchical level of the address structure.
4. It is now known that "Alice is in A". The node B.2.2 forwards the message/call from "Bob" towards A appended with the retrieved name resolution information including the key code RKC(A). For more information on the conventional routing of the message/call, reference is made to the description in connection with FIG. 8.
5. The first node receiving the message/call in address area A (node A.3.1 in the example of FIG. 2) is aware of which node in address area A that is the responsible resolution server, and sends a request to the RS of A (node A.2.1 in this example) to further resolve the location of "Alice".
6. The resolution server (RS) of A is thus contacted and the corresponding key code RKC(A) can be applied to the RS of A to retrieve information on the address area A.1 and the resolution key code RKC(A1) of the next lower hierarchical level of the address structure.
7. It is now known that "Alice is in A.1". The node A.3.1 forwards the message/call towards address area A.1 appended with name resolution information including the key code RKC(A1).
8. The first node receiving the message/call in address area A.1 (node A.1.2 in the example of FIG. 2) is aware of which node in address area A.1 that is the responsible resolution server, and sends a request to the RS of A.1 (node A.1.1 in this example) to further resolve the location of "Alice".
9. The resolution server (RS) of A.1 is thus contacted and the corresponding key code RKC(A1) can be applied to the RS of A.1 to retrieve information on the address area or network node A.1.3 and the resolution key code RKC(A13) of the next lower hierarchical level of the address structure. Alternatively, if the resolution key code RKC(A13) has previously (in the corresponding registration phase) been stored together with info on the address area A.1.3 and the name "Alice", the output may optionally simply be "Alice" and the address of the network node A.1.3.
10. It is now known that "Alice is connected via node A.1.3", and node A.1.2 forwards the message/call to node A.1.3, which via the key code RKC(A13) or the name "Alice" retrieves the final location/address A.1.3.a of "Alice" within the network.
11. Network node A.1.3 may then forward the message/call to "Alice" as part of the normal routing procedure.

Normally the resource "Alice" is an end node such as a user terminal, but it may also be a moving network with a set of further resources that in turn could be moving networks and/or individual resources.

Re-Registration

Figure 7:
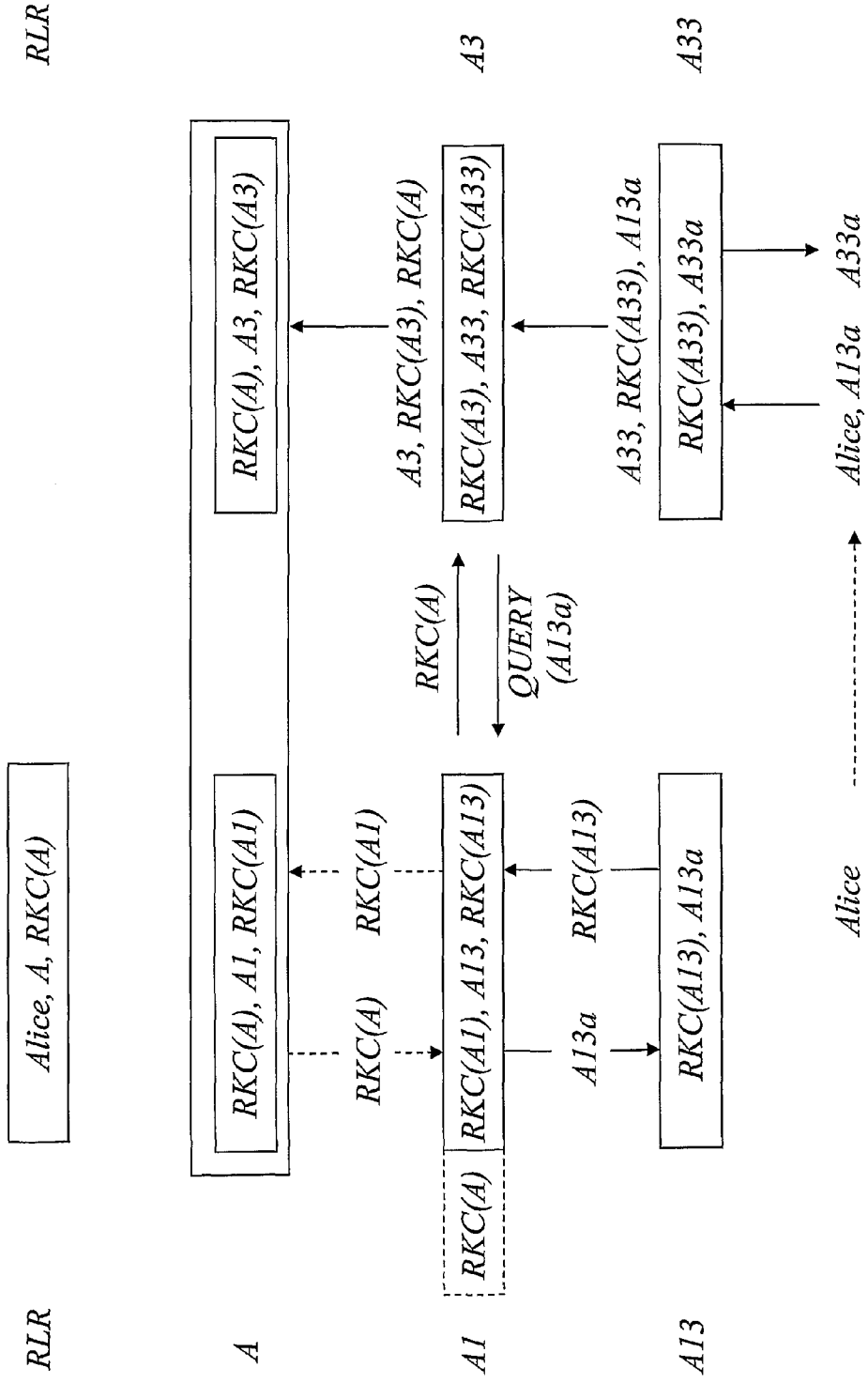
FIG. 7 is a schematic diagram illustrating an example of a re-registration procedure in which resolution key codes are updated, at resource location update, only up to the level of movement in the hierarchical address structure.

FIG. 7 is a schematic diagram illustrating an example of a re-registration procedure in which resolution key codes are updated, at resource location update, only up to the level of movement in the hierarchical address structure.

It should be understood that the below re-registration procedure is merely an example, and many different variations are possible within the scope of the invention.

With reference to FIG. 2 and FIG. 7, it is assumed that "Alice" moves from attachment point A.1.3 to attachment point A.3.3 in address area A.3. It should be appreciated that "Alice" moves up to the level of address area A.

1. "Alice" reports its old address (A.1.3.a) to the new node A.3.3.
2. The network node A.3.3 assigns a new address (e.g. A.3.3.a) to "Alice" from the available range of addresses of that node.
3. If network node A.3.3 has a resolution server "of its own", it generates a resolution key code RKC(A.3.3) and stores this key code together with the network address A.3.3.a of "Alice". Alternatively, a non-local resolution server is utilized for managing the resolution key code(s).
4. The resolution server and/or the network node A.3.3 forwards information on the address of the resolution server/node A.3.3 and the corresponding resolution key code RKC(A33) as well as the old network address A.1.3.a to the resolution server on the next higher level (A.3) of the address structure.
5. The resolution server (RS) of A.3 (here residing in node A.3.2) is informed that "Alice" has moved to a new location, or realizes this from the fact that an old address of "Alice" is appended, and sends a query to the RS of A.1 including the old address A.1.3.a of "Alice". The RS of A.3 can deduce information on the old resolution server(s) (A.1) from the old address A.1.3.a of "Alice" due to the hierarchical address structure. By comparing the old address A.1.3.a with the new address A.3.3.a, it is clear that the movement of Alice needs to be reflected up to the level of address area A.
6. The RS of A.1 reads the old address A.1.3.a of "Alice" and contacts the lower-level network node A.1.3 (deduced from the old network address of "Alice") to retrieve the old key code RKC(A13) of A.1.3.
7. Since the movement of Alice needs to be reflected up to area A, the key code RKC(A13) should be used in one or several steps to finally retrieve the key code RKC(A) associated with address area A.

One option is to first retrieve the key code RKC(A1) in response to the input key code RKC(A13) at RS of A.1 (or alternative by using "Alice" as input), and then request the key code RKC(A) from RS of A by using the retrieved key code RKC(A1). RS of A then responds with RKC(A).

Another option is possible when the resolution key code at each given level and address area has already (in the registration phase) been linked to the resolution key code at the next higher hierarchical level and address area of the address structure. In that case, the key code RKC(A) can be retrieved directly at RS of A.1 in response to the key code RKC(A13), since in this case RKC(A) is already stored in association with RKC(A13) in RS of A.1.

8. In any case, RS of A.1 returns the key code RKC(A) to RS of A.3. Any old information concerning "Alice" in the resolution serves of the old name-to-address resolution chain may then be removed.
9. RS of A.3 then generates its own local resolution key code RKC(A3), which is stored together with information on the address area A.3.3 of the node/resolution server and the corresponding key code RKC(A33) on the next lower level.
10. RS of A.3 also forwards the new key code RKC(A3) together with information on its own address area A.3, and the key code RKC(A) to the resolution server RS of A on the next higher level.
11. RS of A recognizes the resolution key code RKC(A) and can now update the associated information to RKC(A), A.3, RKC(A3).

In this way, when a change occurs in the mapping from name to address, the change (e.g. due to roaming) only needs to propagate to the level of the topological scope of that change. In the example of FIG. 7, the name-to-address resolution chain of "Alice" has been updated only up the level of movement (within address area A).

There exist many variations on the signaling between different address branches of the hierarchical address structure in connection with updates of name-to-address resolution chains, but preferably such communication is handled by the corresponding resolution servers (A3 and A1 in the example of FIG. 7) on the same level of the hierarchy.

Routing Aspects

Figure 8:
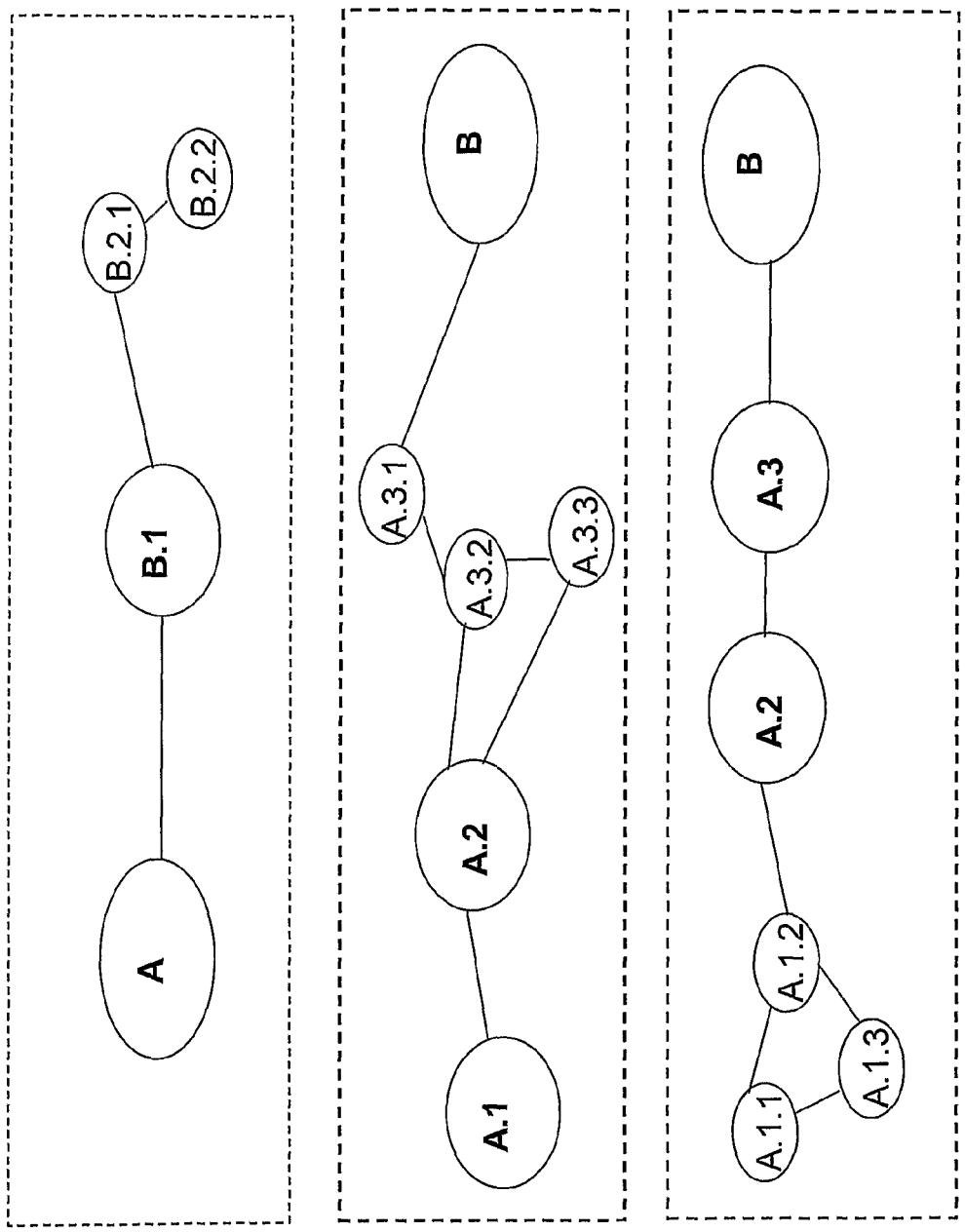
FIG. 8 is a schematic illustration of hierarchically complete network topologies seen from different network nodes in the overall internetwork.

FIG. 8 is a schematic illustration of hierarchically complete network topologies seen from different network nodes in the overall internetwork.

Hierarchically complete usually denotes that the topology that can be seen from any node in the network is as complete as it can be out of the fact that the network is hierarchically structured. It basically means that topology is more abstract the further away from a specific node that other parts of the topology are located.

Considering routing of a message/call from "Bob" to "Alice" (see also FIG. 2):

1. The node B.2.2 will forward the call via B.2.1, which in turn forwards it to a node in B.1. Node B.2.2 may provide a hierarchically complete source route towards A, and in this example it would be: B.2.2, B.2.1, B.1, A (see top-most topology view of FIG. 8).
2. Nodes in B.1 will continue to forward the call to A, in accordance with the topology as seen from nodes in B.1, and possibly in accordance with the provided source route. The source route may then be further complemented with the route through B.1.
3. As the call is received by the first node in A, which is A.3.1 in this example, another step of address resolution takes place, which indicates that resource is in A.1. Node A.3.1 forwards the call via A.3.2 towards A.1 via A.2, and possibly, A.3.1 can complement the source route with the route through A, e.g. A.3.1, A.3.2, A.2, A.1, in accordance with its view of the topology (middle view of FIG. 8).
4. Nodes in A.2 will continue to forward the call to A.1 following the concepts described previously. In case of using source routing, the source route will be complemented with the routing through A.2
5. As the call is received by the first node in A.1, which is A.1.2 in this example, another step of address resolution takes place, which indicates that the resource is attached to A.1.3. Node A.1.2 forwards the call via A.1.3 to the resource (e.g.

Alice's terminal), and possibly, the source route is complemented with the source route through A.1 (see bottom-most topology view).

Source route information can be removed as call exits from each node group, if nodes keep call forwarding state including return path information.

The return path may also be individually routed, by running the same mechanisms described for name resolution and routing as above, but then applied to "Bob".

Moving Network Support

Figure 9:
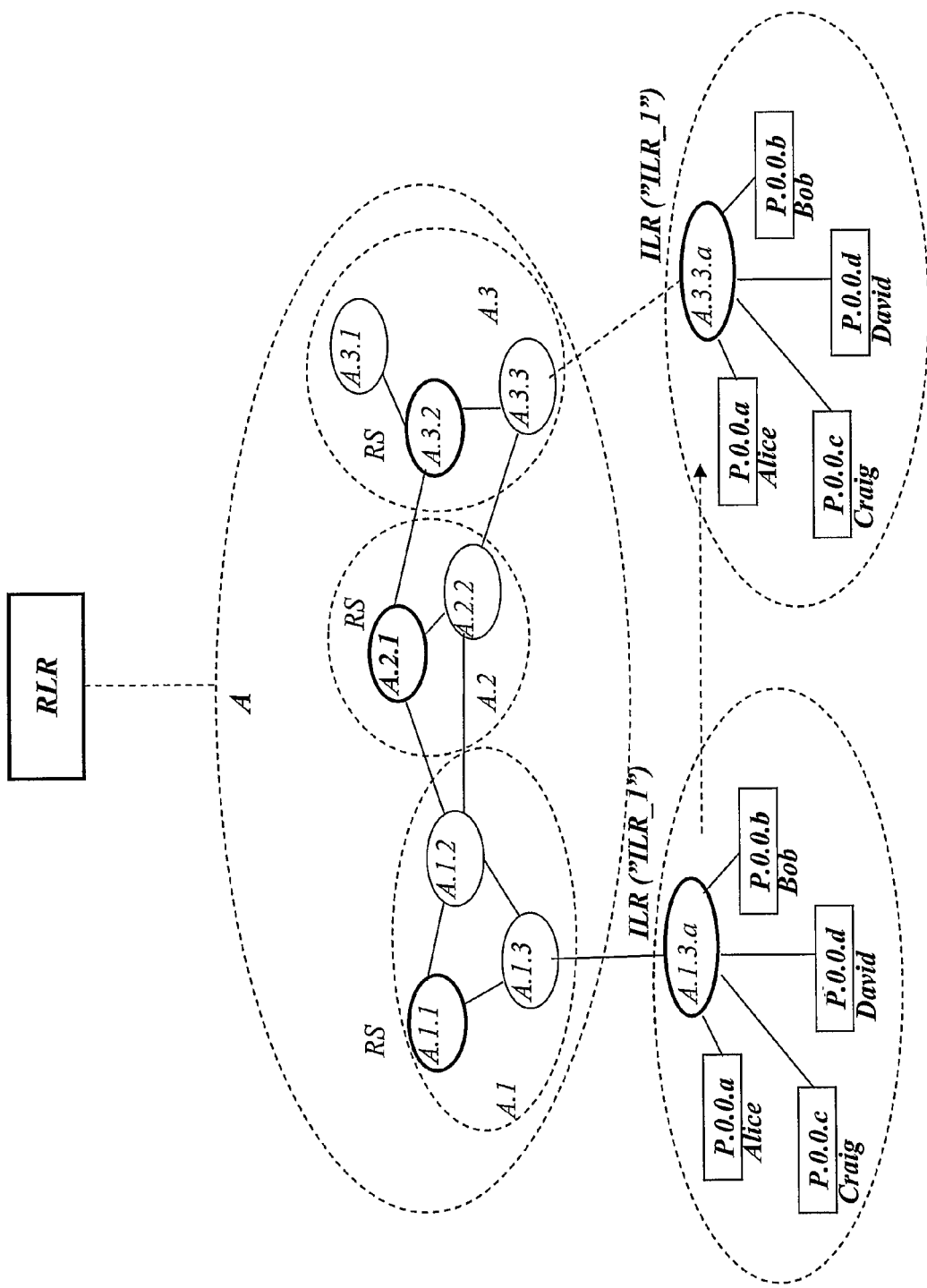
FIG. 9 is a schematic representation of a hierarchical internetwork including a name-address management infrastructure for supporting moving networks according to a preferred exemplary embodiment of the invention.

FIG. 9 is a schematic representation of a hierarchical internetwork including a name-address management infrastructure for supporting moving networks according to a preferred exemplary embodiment of the invention.

A new entity, here called the Interception Location Register (ILR) for simplicity, is introduced for handling moving networks (e.g. PAN, NEMO and other types of moving or movable networks). The ILR node is a network unit responsible for a moving network attached to the internetwork. Preferably, the ILR node is configured for intercepting registration requests, from resources within the moving network to the internetwork, for successively building respective distributed name-to-address resolution chains through the hierarchical address structure. The node is preferably also configured for replacing, on behalf of each such name-address registration request, the internal resource address with the internetwork address of the ILR node. In other words, the ILR will intercept registration requests from each user, and on behalf of each registration only register the address of the ILR. This will avoid the problem of a flood of re-registrations and address re-assignments as the whole network roams to another point of attachment.

Registration

1. The Interception Location Register (ILR) gets assigned an address according to its current network point of attachment (A.1.3.*a* in this case)
2. The ILR performs a registration procedure to the RLR according to the exemplary registration procedure previously described. The user name could be "ILR_1". In the RLR, the registration information will show up as "ILR_1 is in A".
3. The resources within the network may be individual resources such as terminal entities and/or additional moving network and are generally assigned (unstructured and/or private) addresses such as P.0.0.*a*.
4. A user registers via its terminal, the user name and assigned address (e.g. Alice, P.0.0.*a*) via the ILR.
5. The ILR forwards the user registration to the RLR but replaces the address P.0.0.*a* with the address A.1.3.*a* of the ILR.
6. The RLR stores the information that "Alice is looked up via ILR_1", and also information that "ILR_1 is in A".
7. The other users in the same moving network perform the same procedure as described for "Alice".

Re-Registration Due to Network Movement to a New Point of Attachment

This follows the same scheme as was described in connection with FIG. 7, with the addition that it is only the ILR that reports a change of network attachment, and it is only the ILR that gets assigned a new address.

Examples of Possible Implementation Details

Figure 10:
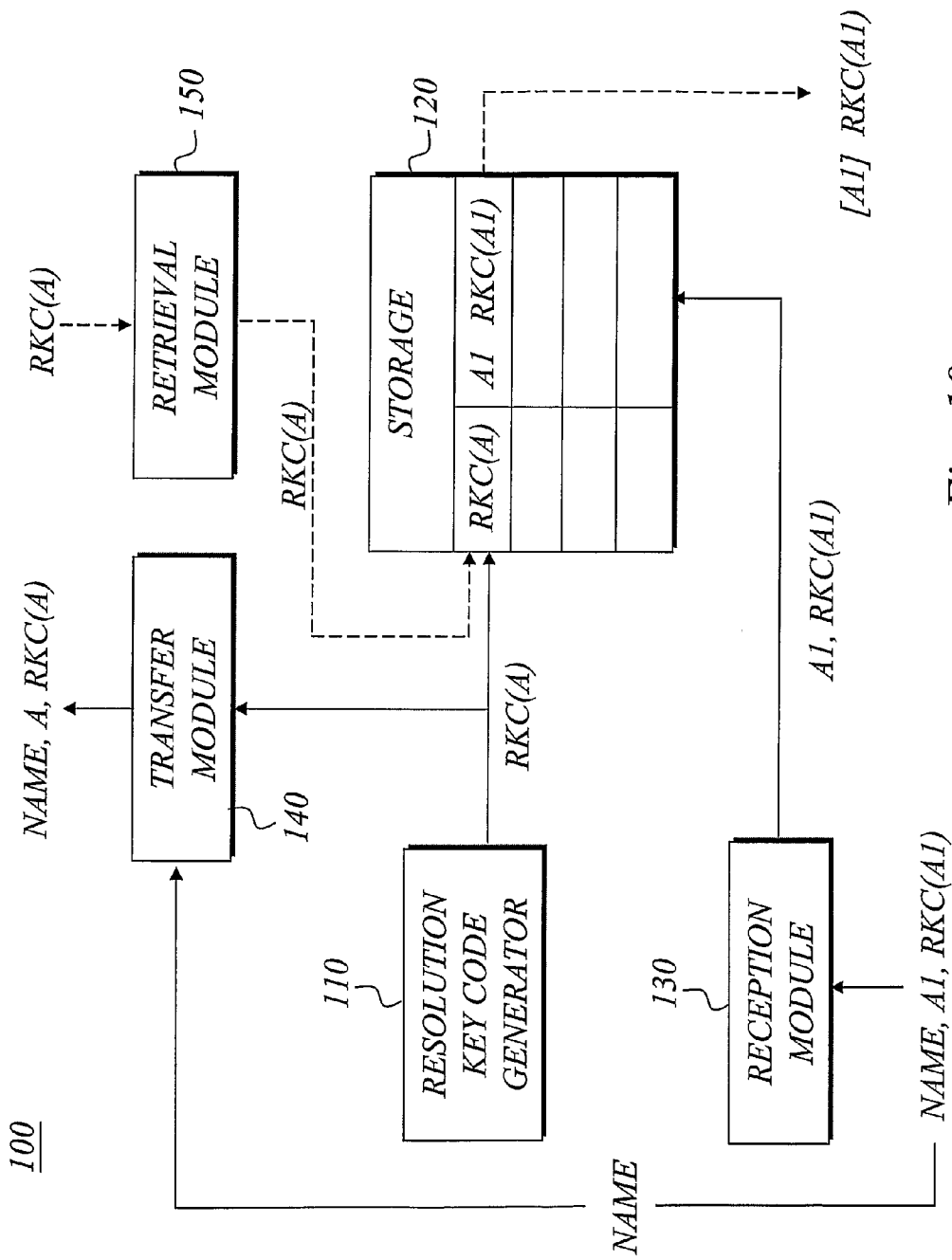
FIG. 10 is a schematic block diagram of a resolution server according to a preferred exemplary embodiment of the invention.

FIG. 10 is a schematic block diagram of a resolution server according to a preferred exemplary embodiment of the invention. The resolution server 100 basically comprises a key code generator 110, a storage module 120, a reception module 130, a transfer module 140 and a retrieval module 150.

The key code generator 110 is operable for generating a resolution key code for a given resource/name in the overall process of building a name-to-address resolution chain for that resource. The key code is preferably unique for the considered name, for example by using a hash function to generate the key code in response to the name and possibly also in response to the address prefix. Considering a resolution server responsible for address area A, the server will generate a key code RKC(A), which will be stored in the storage module 120 together with name resolution information from the resolution server at the next lower level and address area A1. The reception module 130 receives the lower-level name resolution information including information on the next lower address area A1 and the corresponding resolution key code RKC(A1) together with the name. The information on the next lower address area A1 and the corresponding resolution key code RKC(A1) are transferred from the reception module 130 to the storage module 120 for storage in association with the key code RKC(A) related to the name of the resource. The name information NAME is transferred from the reception module 130 to the transfer module 140 for further transfer together with information on the current address area A and the corresponding key code RKC(A) to a resolution server on the next higher level or the top-level location register.

For name-to-address resolution (indicated by dashed lines in FIG. 10), the retrieval module 150 receives a resolution key code RKC(A) to be used as an input key to the resolution server and more particularly to the storage module 120 acting as a "look-up table". Information on the relevant address area A1 on the next lower level and the corresponding key code RKC(A1) are retrieved in response to the key code RKC(A). The retrieved key code RKC(A1) can then be transferred to the resolution server of address area A1.

The concept of a server should be interpreted broadly as any processing unit, computer or network node with such capabilities.

Figure 11:
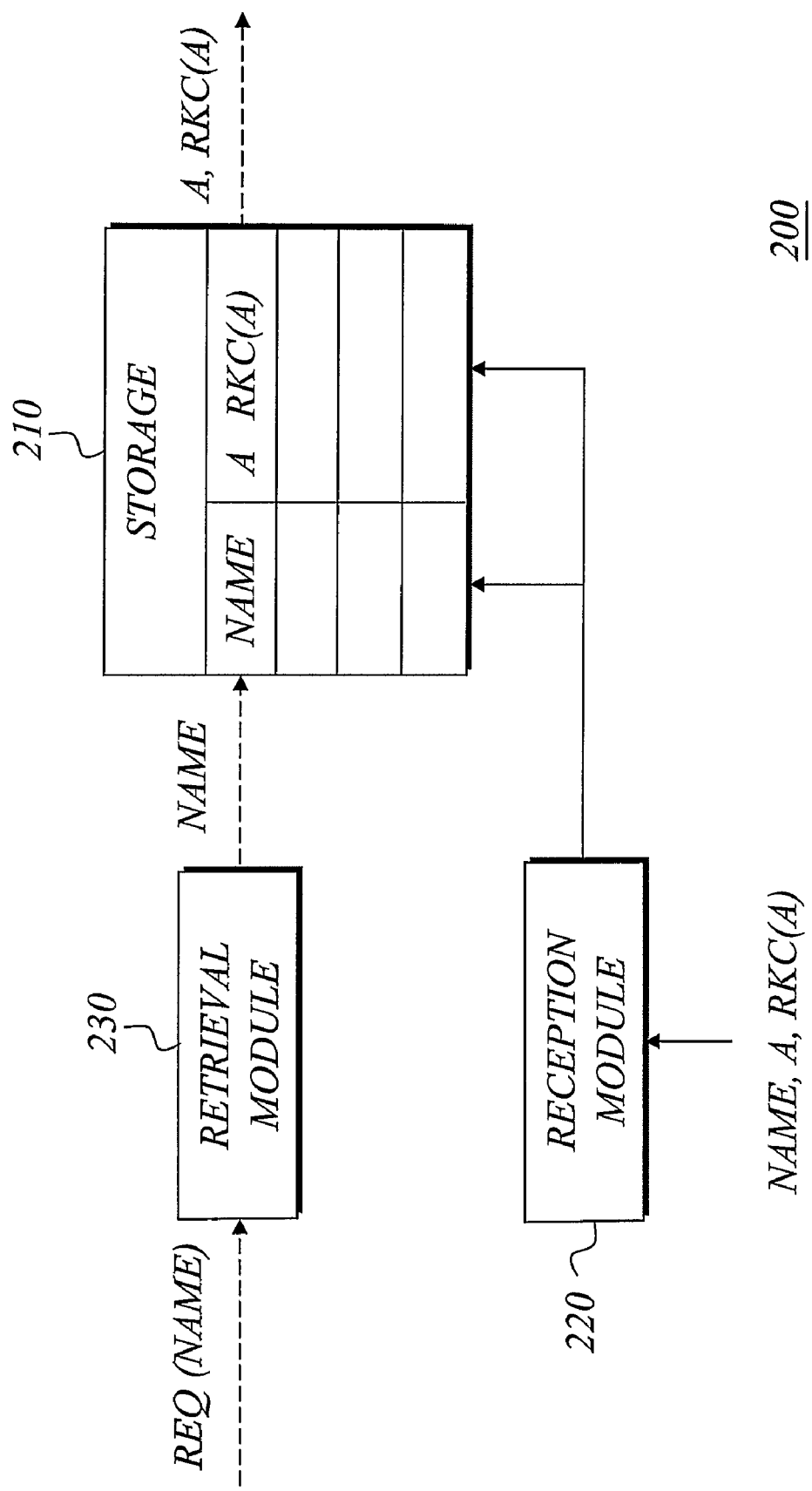
FIG. 11 is a schematic block diagram of a resource location register according to a preferred exemplary embodiment of the invention.

FIG. 11 is a schematic block diagram of a resource location register according to a preferred exemplary embodiment of the invention. The resource location register 200 basically comprises a storage module 210, a reception module 220 and a retrieval module 230. The storage module 220 is adapted for storing name information of a resource/user in association with information on address area A and resolution key code RKC(A) of the highest hierarchical level of the address structure. The reception module 220 normally receives this information from the resolution server at the highest hierarchical level, and transfers the information to the module 210 for storage.

The name information only needs to be present at the top-level register, which is a clear advantage from a security perspective. In addition, there is no need to store the full network address of the resource at the top-level register, which further enhances the security features of the name-to-address resolution infrastructure of the invention.

For name-to-address resolution (indicated by dashed lines in FIG. 11) the retrieval module 230 receives a name-to-address resolution request including name information of a given resource, and applies the name as an input key to the storage module to retrieve information on address area A and resolution key code RKC(A) of the highest hierarchical level of the address structure. The key code RKC(A) can then be transferred to the resolution server of address area A for continued back-tracing of the name-to-address resolution chain of the given resource.

Figure 12:
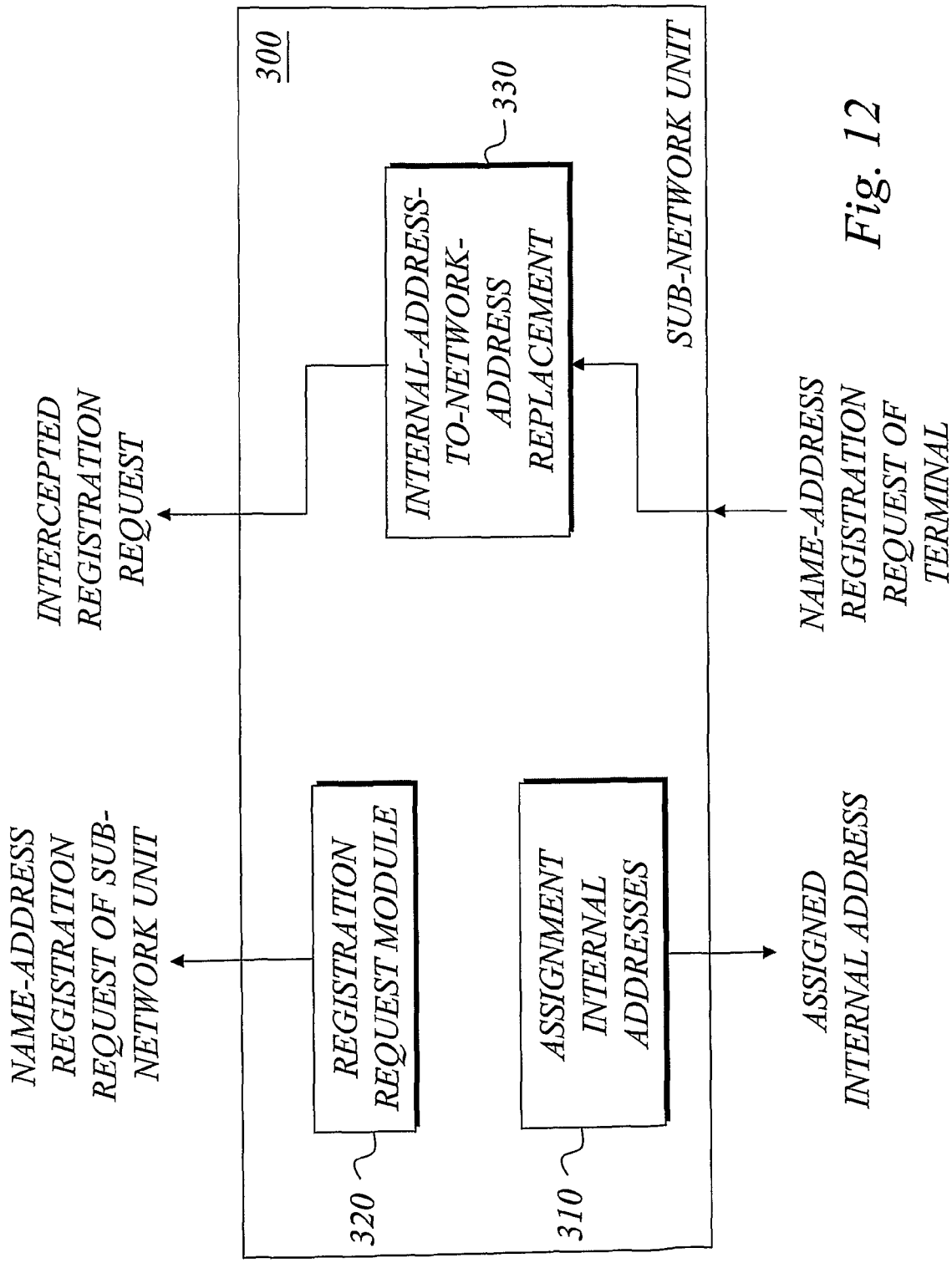
FIG. 12 is a schematic block diagram of a sub-network unit according to a preferred exemplary embodiment of the invention.

FIG. 12 is a schematic block diagram of a network unit according to a preferred exemplary embodiment of the invention. The network unit 300 is responsible for a moving network attached to the overall internetwork, and basically comprises a module 310 for assignment of internal addresses to resources within the moving network, a registration request module 320 and an interception module 330. The registration request module 320 is responsible for initiating a name-address registration of the network unit 300, whereas the interception module 330 is configured for intercepting requests name-address registration requests from resources (such as user terminals) within the moving network. The interception module 330 is further adapted for replacing, for each such name-address registration request, the internal resource (terminal) address with the assigned internetwork address of the network unit.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] RFC 1034, "*Domain Names—Concepts and Facilities*".
[2] RFC 1035, "*Domain Names—Implementation and Specification*".
[3] RFC 2136, "*Dynamic Updates in the Domain Name System*".

The invention claimed is:

1. A computer-generated method for name-address management in an internetwork having a hierarchical address structure with a number of address areas, the method comprising:
    defining by a plurality of resolution servers, a set of interlinked resolution key codes for bridging between address areas on different levels of the hierarchical address structure, wherein each of at least a subset of the resolution key codes is associated with a first address area at a first hierarchical level and linked to name resolution information including information indicating a second address area at a second, lower hierarchical level of the address structure as well as a resolution key code associated with the second address area at the second, lower hierarchical level; and
    successively building up by the plurality of resolution servers, for a given resource, a distributed name-to-address resolution chain through the hierarchical address structure utilizing the set of interlinked resolution key codes for bridging between address areas on different levels of the hierarchical address structure.

2. The method of claim 1, wherein the step of successively building up a distributed name-to-address resolution chain is initiated in response to a name address registration request including name information from the given resource, and the step of successively building up a name-to-address resolution chain comprises the steps of:
    storing a key code by a first resolution server responsible for the address area associated with the key code together with the name resolution information associated with a lower hierarchical level of the address structure; and
    transferring the key code from the first resolution server to a second resolution server responsible for an address area at a higher hierarchical level of the address structure;

wherein the steps of storing and transferring are repeated for each of the resolution key codes, level-by-level, until the highest hierarchical level has been reached; and storing by a top-level resource location register, the name information linked to a resolution key code associated with an address area at the highest hierarchical level of the address structure and information on the associated address area.

3. The method of claim 2, wherein the name-to-address resolution chain extends between the top-level resource location register and the given resource.

4. The method of claim 2, further comprising updating by the plurality of resolution servers, resolution key codes at location update of the given resource only up to the level of movement in the hierarchical address structure.

5. The method of claim 2, wherein the given resource is an individual resource attached to an attachment point of the internetwork.

6. The method of claim 2, wherein the given resource is a network unit responsible for a moving network including a group of further resources, and the network unit performs the steps of:

assigning internal addresses to the further resources within the moving network;

intercepting corresponding name-address registration requests from the further resources within the moving network; and replacing, on behalf of each such name-address registration request, the internal address of the further resource with an internetwork address of the network unit.

7. The method of claim 1, wherein at least one resolution key code associated with a given address area at a given hierarchical level is also linked to a resolution key code associated with an address area at a higher hierarchical level of the address structure.

8. The method of claim 1, wherein name-to-address resolution for a given resource is performed, during routing of a message in the internetwork, by successively back-tracing by the plurality of resolution servers, a distributed name-to-address resolution chain through the hierarchical address structure by means of a set of interlinked resolution key codes for bridging between address areas on different levels of the hierarchical address structure.

9. The method of claim 8, wherein the step of successively back-tracing a distributed name resolution chain comprises the steps of:

retrieving by a resolution server responsible for an address area at the highest hierarchical level of the address structure, name resolution information including a resolution key code associated with the address area at the highest hierarchical level of the address structure and information on the associated address area from a top-level location register in response to a name-to-address resolution request; and applying by a resolution server responsible for the associated address area at the corresponding hierarchical level, a resolution key code as a key to retrieve name resolution information pointing out an address area at a lower hierarchical level in the address structure and, if applicable, also a resolution key code associated with the address area at the lower hierarchical level;

wherein the step of applying is repeated for each of at least a subset of the resolution key codes, level-by-level, starting from the resolution key code at the highest hierarchical level and downwards through lower hierarchical levels of the address structure.

10. The method of claim 9, wherein the last resolution key code in the name-to-address resolution chain, or the name associated with the given resource, finally points out a full address of the given resource.

11. The method of claim 1, wherein the name-to-address resolution chain is a linked list structure distributed over the hierarchical levels of the address structure with the resolution key codes linking the distributed linked list structure.

12. An infrastructure for name-address management in an internetwork having a hierarchical address structure with a number of address areas, the infrastructure comprising:

a set of defined interlinked resolution key codes for bridging between address areas on different levels of the hierarchical address structure, wherein each of at least a subset of the resolution key codes is associated with a first address area at a first hierarchical level and linked to name resolution information including information indicating a second address area at a second, lower hierarchical level of the address structure as well as a resolution key code associated with the second address area at the second, lower hierarchical level; and a plurality of resolution servers, each server being associated with a different address area, wherein each server stores the resolution key code for the server's associated address area, and works with other servers to successively build up, for a given resource, a distributed name-to-address resolution chain through the hierarchical address structure utilizing the set of interlinked resolution key codes for bridging between address areas on different levels of the hierarchical address structure.

13. The infrastructure of claim 12, wherein each of the resolution servers transfers the associated resolution key code together with information on the address area of the resolution server as well as the name information to another resolution server responsible for an address area at a higher hierarchical level of the address structure, wherein the transferring is repeated level-by-level until the highest hierarchical level has been reached;

wherein the infrastructure comprises a top-level resource location register that stores the name information linked to a resolution key code associated with an address area at the highest hierarchical level of the address structure and information on the address area associated with the highest hierarchical level.

14. The infrastructure of claim 13, wherein the name resolution chain extends between the top-level resource location register and the given resource.

15. The infrastructure of claim 13, further comprising means for updating resolution key codes at location update of the given resource only up to the level of movement in the hierarchical address structure.

16. The infrastructure of claim 13, wherein the given resource is an individual resource attached to an attachment point of the internetwork.

17. The infrastructure of claim 13, wherein the given resource is a network unit responsible for a moving network including a group of further resources, and the network unit assigns internal addresses to the further resources within the moving network; intercepts corresponding name-address registration requests from the further resources within the moving network; and replaces, on behalf of each such name-address registration request, the internal address of the further resource with an internetwork address of the network unit.

18. The infrastructure of claim 12, wherein the infrastructure performs name-to-address resolution for a given resource during routing of a message through the internetwork by successively back-tracing a distributed name-to-address resolution chain through the hierarchical address structure based on a set of interlinked resolution key codes bridging between address areas on different levels of the hierarchical address structure.

19. The infrastructure of claim 18, wherein:
the infrastructure retrieves name resolution information including a resolution key code associated with an address area at the highest hierarchical level of the address structure and information on the associated address area from a top-level location register in response to a name-to-address resolution request; and
the infrastructure applies, for each of at least a subset of the resolution key codes, the code as a key to a corresponding resolution server to retrieve name resolution information pointing out another of the resolution servers responsible for an address area at a lower hierarchical level in the address structure and, if applicable, also a resolution key code associated with the address area at the lower hierarchical level, wherein the applying is thus repeated level-by-level starting from the resolution key code at the highest hierarchical level and downwards through lower hierarchical levels of the address structure.

20. A resolution server in an internetwork having a hierarchical address structure with a number of address areas, said server comprising:
a memory that stores, for a given resource, interlinked resolution key codes for bridging between address areas on different levels of the hierarchical address structure to support name-to-address resolution, wherein the resolution server is associated with a first address area at a first hierarchical level of the address structure; and
a processor that generates and stores an associated resolution key code linked to name resolution information including an indication of a second address area at a second, lower hierarchical level of the address structure and a resolution key code associated with the second address area at the second, lower hierarchical level of the address structure.

21. The resolution server of claim 20, wherein the resolution server retrieves, when the associated resolution key code is applied as an input key, name resolution information pointing out an address area at the second, lower hierarchical level in the address structure and a resolution key code associated with the second address area at the second, lower hierarchical level.

22. The resolution server of claim 20, wherein the resolution server transfers the associated resolution key code together with information on the address area associated with the resolution server as well as name information of the given resource to a resolution server responsible for an address area at a higher hierarchical level of the address structure.

23. A resource location register in an internetwork having a hierarchical address structure with a number of address areas, said resource location register comprising:
a memory that stores, for a given resource, name information associated with the given resource together with a resolution key code and address area associated with the highest hierarchical level of the address structure to support name-to-address resolution, wherein the resolution key code enables bridging to name resolution information including information indicating another address area at a lower hierarchical level in the address structure as well as a resolution key code associated with the another address area at the lower hierarchical level; and
a processor that retrieves the resolution key code and address area associated with the highest hierarchical level of the address structure in response to a name-to-address resolution request.

24. A network unit responsible for a moving network attached to an internetwork having a hierarchical address structure with a number of address areas, said network unit comprising:
an Interception Location Register (ILR) that intercepts name-address registration requests sent from resources within the moving network to the internetwork, each request including an internal resource address within the moving network; that successively builds respective distributed name-to-address resolution chains through the hierarchical address structure of the internetwork utilizing interlinked resolution key codes for bridging between address areas on different levels of the hierarchical address structure; and that replaces, on behalf of each name-address registration request, the internal resource address with the internetwork address of the network unit.

* * * * *